Figures 1, 2:
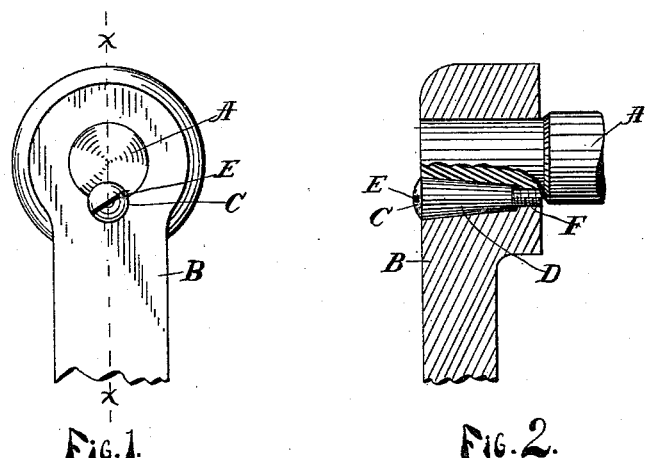

(No Model.)

R. B. HAIN.
CRANK FASTENING.

No. 420,010. Patented Jan. 21, 1890.

Witnesses
Adolph B. Mason
Grace G. Chapman.

Inventor
Ralph B. Hain
By his Attorney
Cyrus W. Perkins

UNITED STATES PATENT OFFICE.

RALPH BENTON HAIN, OF GRAND RAPIDS, MICHIGAN, ASSIGNOR TO THE GRAND RAPIDS CYCLE COMPANY, OF SAME PLACE.

CRANK-FASTENING.

SPECIFICATION forming part of Letters Patent No. 420,010, dated January 21, 1890.

Application filed October 21, 1889. Serial No. 327,724. (No model.)

*To all whom it may concern:*

Be it known that I, RALPH BENTON HAIN, a citizen of the United States, residing at Grand Rapids, in the county of Kent and State of Michigan, have invented certain new and useful Improvements in Crank-Fastenings; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1 is an end view of the crank. Fig. 2 is a sectional side view on line $x\ x$ of Fig. 1.

Similar letters refer to similar parts.

My invention has for its object the production of a crank-fastening at once strong and simple by means of a key fitting a hole drilled on the division-line of crank and axle.

I describe my invention as follows:

A is the axle; B, the crank; C, the key or crank fastening of tapering form D, with a screw-point F fitting in the hole drilled on the division-line of crank and axle, the inner end of said hole being threaded to receive said screw end of key, the outer end of said key having a slot or eye E for a screw-driver. So made it is impossible for the crank to turn on the axle. The same device may be used to fasten the wheel or pulley to shafting.

Having thus described my invention, what I claim as novel, and desire to secure by Letters Patent, is—

A means for securing together a crank and axle, in which the former is provided at one side of its axle-aperture with a tapering recessed portion threaded adjacent the part at which the axle enters said aperture, and in which the axle is provided with a correspondingly-tapered recessed and threaded portion, said means consisting in a key of tapering form having a screw-threaded point adapted to fit the recessed and threaded portions in the crank and axle, substantially as described.

In testimony whereof I affix my signature in presence of two witnesses.

RALPH BENTON HAIN.

Witnesses:
ADOLPH B. MASON,
GRACE G. CHAPMAN.